(12) United States Patent
Lin et al.

(10) Patent No.: US 6,967,615 B1
(45) Date of Patent: Nov. 22, 2005

(54) PHASE CENTER MEASUREMENT OF ELECTRONIC WARFARE ANTENNAS USING GPS SIGNALS

(75) Inventors: David M. Lin, Beavercreek, OH (US); James B. Y. Tsui, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 19 days.

(21) Appl. No.: 10/816,352

(22) Filed: Apr. 2, 2004

(51) Int. Cl.[7] .............................................. G01S 13/06
(52) U.S. Cl. ........................ 342/147; 342/13; 342/174; 342/417
(58) Field of Search ............................. 342/173, 174, 342/13, 56, 98, 113, 147, 156–158, 189, 195, 342/357.08, 357.09, 417, 418

(56) References Cited

U.S. PATENT DOCUMENTS

| 6,175,725 | B1 | 1/2001 | Auber |
| 6,218,983 | B1 | 4/2001 | Kerry et al. |
| 6,222,479 | B1 | 4/2001 | Honigsbaum |
| 6,237,496 | B1 | 5/2001 | Abbott |
| 6,249,252 | B1 | 6/2001 | Dupray |
| 6,339,396 | B1 | 1/2002 | Mayersak |
| 6,411,249 | B1 * | 6/2002 | Rose ........................... 342/13 |
| 6,421,010 | B1 | 7/2002 | Chadwick et al. |
| 6,424,837 | B1 | 7/2002 | Hall et al. |
| 6,438,381 | B1 | 8/2002 | Alberth, Jr. et al. |
| 6,492,937 | B1 | 12/2002 | Sparrow et al. |
| 6,594,582 | B1 | 7/2003 | Quinn |
| 6,598,009 | B2 | 7/2003 | Yang |
| 6,628,231 | B2 | 9/2003 | Mayersak |
| 6,670,920 | B1 | 12/2003 | Herrick |
| 6,700,536 | B1 | 3/2004 | Wiegand |
| 6,727,851 | B2 * | 4/2004 | Bass et al. .................. 342/418 |
| 2002/0033769 | A1 * | 3/2002 | Bass et al. .................. 342/418 |
| 2004/0227658 | A1 * | 11/2004 | VandenBerg .............. 342/25 R |

OTHER PUBLICATIONS

"Direction of arrival estimation via extended phase interferometry", Ying-Wah Wu; Rhodes, S.; Satorius, E.H. Aerospace and Electronic Systems, IEEE Transactions on vol. 31, Issue 1, Jan. 1995 P(s):375-381.*

* cited by examiner

Primary Examiner—John B. Sotomayor
(74) Attorney, Agent, or Firm—AFMCLO/JAZ; Gerald B. Hollins

(57) ABSTRACT

An electronic warfare apparatus for determining the location of for example a ground based source of electromagnetic radiation from a platform such as an aircraft. Location is determined using angle of arrival based vector determinations provided by signal differences detected in the ground based signals arriving at platform antennas. Elimination of angle of arrival errors arising from imprecise knowledge of platform electronic warfare antenna characteristics is a focal point of the invention and is accomplished through precision use of global position system information received via the same electronic warfare antennas. Accurate determination of electronic warfare antenna characteristics prior to consideration of the large distance multiplication factors imposed by aircraft to distant signal source geometry enables accurate distant signal source location using the invention.

11 Claims, 2 Drawing Sheets

US 6,967,615 B1

PHASE CENTER MEASUREMENT OF ELECTRONIC WARFARE ANTENNAS USING GPS SIGNALS

RIGHTS OF THE GOVERNMENT

The invention described herein may be manufactured and used by or for the Government of the United States for all governmental purposes without the payment of any royalty.

CROSS REFERENCE TO RELATED PATENT DOCUMENT

The present document is somewhat related to the co pending and commonly assigned patent application document "GPS RECEIVER WITH ELECTRONIC WARFARE RECEIVER FRONT END", Ser. No. 10/815,600 filed of even date herewith. The contents of this related even filing date application are hereby incorporated by reference herein.

BACKGROUND OF THE INVENTION

In many electronic warfare applications, it is desirable determine the location of a certain distantly located signal emitter. Such a determination may be made in relative terms with respect to a known reference position and may also be transferred from this relative position to a fixed or global position with the aid of additional processing. In making such position determinations, the angle of arrival (AOA) of the distant signal with respect to a present reference frame is often used as an intermediary step in determining a range vector connecting the present reference location and the distant signal source. Even where it is possible to interpret data relating to the angle of arrival with significant accuracy (for example where a desirable electronically implemented algorithm is available), the relative locations of the receiving antennas used in collecting this data significantly determines the accuracy of the overall distant signal locating process. If the vectors connecting the receiving antennas are determined with errors, these errors can cause enormous emitter location determination errors.

As shown in FIG. 1, the distance between two electronic warfare receiving antennas 102 and 104 disposed on the same platform or aircraft 100 is very short in comparison with the range distance 108 to the signal emitter 106. For example, the distance between the two aircraft-wing mounted antennas 102 and 104 in FIG. 1 can be in the range of tens of meters, even for the largest of possible host aircraft, while the range 108 to the electronic warfare emitter can be hundreds of kilometers in a typical scene. Let us assume for example that the FIG. 1 distance between the antennas 102 and 104 is ten meters and the range 108 is one hundred kilometers. Under these conditions a one-millimeter error in the believed location of an antenna 102 or 104 can cause approximately a 10 meter error in the determination of range 108 (the distance ratios being 10,000 in each instance). Therefore in order to minimize such error, the vector between the electronic warfare antennas 102 and 104 must be measured very accurately.

From this discussion it may be appreciated that differing arrangements of the FIG. 1 measuring event may require the use of either a single electronic warfare antenna on the aircraft 100 or multiple of such antennas. FIG. 1 and the discussion in the preceding paragraph thus may be interpreted to imply that a plurality of electronic warfare antennas, especially two such antennas, are so included and that it is the distance between the effective electrical center point of these antennas that is of a major accuracy concern in the invention. While these implications and interpretations are justified and indeed provide a most easily appreciated understanding of the invention, it should be realized that the invention is not limited to such a two antenna situation and that it may also extend to a single antenna and to the more than two antennas situations where even the instantaneous global positions of a single or more than two movable platform antennas are of concern because of their possible effect on distant signal source location determinations.

According to the present state of the electronic warfare art the locations of antennas such as the FIG. 1 antennas 102 and 104 used for electronic warfare purposes are determined using global position system receivers and the overall capabilities residing in the global position system. In this present art arrangement an electronic warfare antenna location vector is determined from measurements accomplished using an additional global position system antenna that is dedicated to this specific purpose; i.e., a global position system antenna is placed physically close to each electronic warfare antenna under consideration and the relative positions of the global position system antennas are then measured accurately by global position system techniques. Once the location of each thus added global position system antenna is measured, the vector between the electronic warfare antennas can be determined—by physical measurements for example.

In addition to the added complexity of supplying, mounting and measuring associated with the added global position system antennas used in this present state of the electronic warfare art, this procedure can also encounter measurement error as a result of the phase center or the electrical center of the electronic warfare antenna being located in a position differing significantly from the physical center of the antenna. The present invention is believed to provide an arrangement overcoming each of these difficulties with the present state of the electronic warfare art and the determination of a vector between electronic warfare antennas.

SUMMARY OF THE INVENTION

The present invention provides a procedure and an apparatus enabling accurate measuring of distances and angles between a movable platform such as an aircraft and a distant signal source such as a ground-located electromagnetic source.

It is therefore an object of the present invention to provide for the accurate measurement of bearing angles and large distances using an electronic measurement arrangement that is accuracy controlled by a small reference measurement.

It is another object of the invention to provide for the convenient measurement of small critical dimensions in an electronic measurement apparatus using global position system procedures.

It is another object of the invention to provide accurate knowledge of small antenna dimension effects in an electronic warfare system in order to preclude multiplication of errors attending such dimensions in antenna-accomplished measurements.

It is another object of the invention to provide a beneficial usage of a combined global position system apparatus and electronic warfare apparatus that is disclosed in a companion patent document hereto.

It is another object of the invention to provide for accuracy improvement in measurements made with an electronic warfare signal reception apparatus.

It is another object of the invention to measure accurately a vector connecting the phase center of two EW antennas using GPS signals received in an electronic warfare receiver.

It is another object of the invention to provide accommodation for a plurality of real world accuracy difficulties affecting measurements made with an electronic warfare radio receiver apparatus.

It is another object of the invention to provide an additional use for global position system signals.

These and other objects of the invention will become apparent as the description of the representative embodiments proceeds.

These and other objects of the invention are achieved by signal source locating apparatus comprising the combination of:

a ground based source of microwave frequency electrical signals;
 an aircraft carried radio frequency receiving and signal processing apparatus compatible with said ground based source of microwave frequency electrical signals;
 said radio frequency receiving and signal processing apparatus including first and second signal receiving antenna members carried by said aircraft and generating angle of arrival related electrical signals in response to signals received from said ground based source of microwave frequency electrical signals;
 a source of standardized physical measurement calibration electrical signals of compatible frequency with said ground based source of microwave frequency electrical signals;
 means for calibrating selected portions of said electronic locating apparatus including location error generating dimensional portions of said first and second signal receiving antenna members carried by said aircraft in response to said standardized physical measurement calibration electrical signals;
 signal location processing apparatus operative on said angle of arrival related electrical signals and generating electrical signals representing relative location of said ground based source of microwave frequency electrical signals with respect to said aircraft.

BRIEF DESCRIPTION OF THE DRAWING

The accompanying drawings incorporated in and forming a part of the specification, illustrate several aspects of the present invention and together with the description serve to explain the principles of the invention. In the drawings.

DETAILED DESCRIPTION OF THE INVENTION

In the above identified patent document "GPS RECEIVER WITH ELECTRONIC WARFARE RECEIVER FONT END" two of the inventors named in the present patent document and a third colleague have disclosed an invention in which certain functions of an electronic warfare radio receiver and a global position system radio receiver are advantageously combined. The present invention enlarges upon the concept of this receiver combination and provides specific use details for the combination receiver in solving a frequent electronic warfare signal-locating problem. The "GPS RECEIVER WITH ELECTRONIC WARFARE RECEIVER FONT END" document has been incorporated by reference herein in the material above.

Generally the underlying concept for the present invention may be stated in simple terms. In lieu of the presently practiced procedure wherein a global position system antenna is disposed adjacent an electronic warfare antenna for antenna dimensional and location calibration purposes we find it is possible to use the electronic warfare antenna itself for receiving calibrating global position system signals. In this arrangement the electronic warfare antenna location determined by the received global position system signals is certain to involve the correct phase center of the electronic warfare antenna. Details attending this procedure including signal frequency considerations and others are included in the following discussion.

The band pass of an electronic warfare antenna is typically from 0.5 to 18 GHz. The global position system signals of possible present interest are the L1 and L2 signals located at 1.57542 and 1.2276 gigahertz respectively, frequencies that are thus covered by a typical electronic warfare antenna. A typical electronic warfare receiver moreover has an instantaneous bandwidth of 1 GHz or more. The bandwidth of the global position system signal is around 2 megahertz at the L1 frequency for the C/A code civilian signal and 20 megahertz at the L1 and L2 frequencies for the P(Y) code military signals. Suppose that only the L1 frequency is of interest for present purposes; at this frequency a bandwidth of 20 MHz is adequate and also accommodates both codes. In addition it has been demonstrated that the civilian global position system signal with a bandwidth of 2 MHz can be processed through a single electronic warfare receiver output with a bandwidth of 9.77 megahertz.

Figure 1:
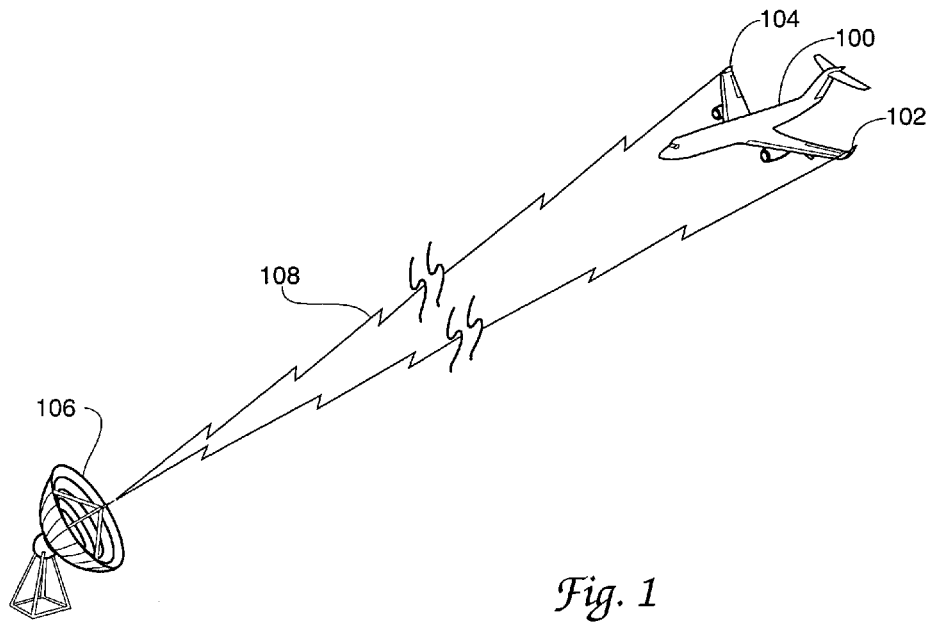
FIG. 1 shows an aircraft locating a ground sourced electromagnetic signal.
Figure 2:
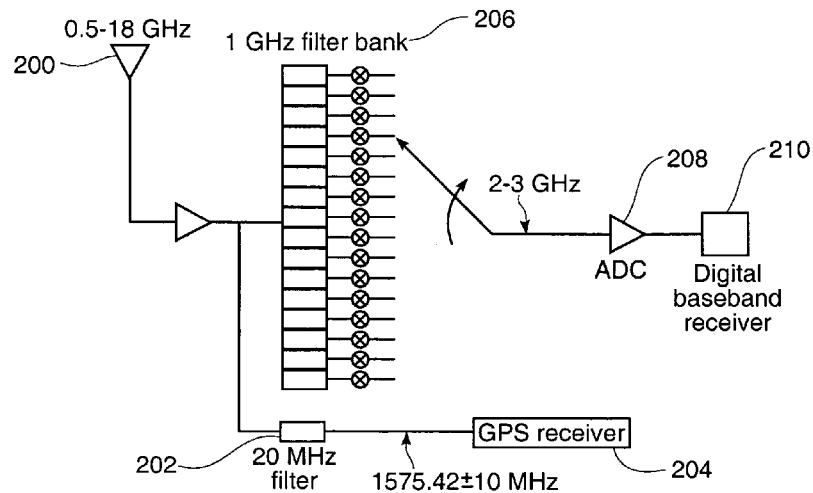
FIG. 2 shows the processing of a global position system signal by a conventional global position system radio receiver in block diagram form.

Many different approaches may be used to process the global position system signal received in an electronic warfare antenna such as antenna 102 or 104 in FIG. 1 in order to accomplish the present vector between antennas determination function. Two of these possible approaches are discussed herein; the first by way of the FIG. 2 drawing. In FIG. 2 the GPS signal is received by the electronic warfare antenna 200 and filtered through a 20 megahertz narrow band filter 202 for application to a conventional global position system receiver 204. The 1-gigahertz filter bank at 206, the analog-to-digital converter 208, and the digital baseband receiver 210 in the FIG. 2 apparatus are parts of the electronic warfare receiver and its signal search and identification function. Signals processed by the global position system receiver 204 are additionally processed as discussed below to accomplish the antenna location determining function of the present invention.

Figure 3:
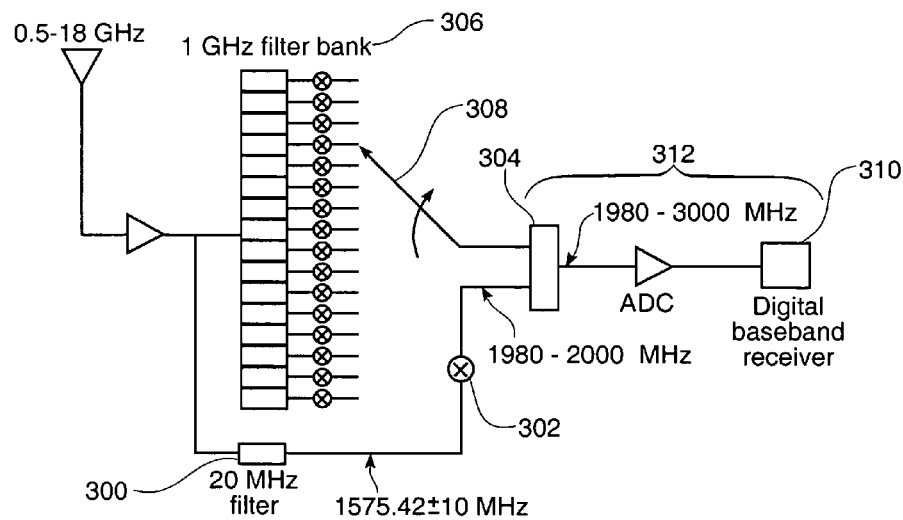
FIG. 3 shows the processing of a global position system signal by a portion of a combination electronic warfare radio receiver in block diagram form.

A second arrangement for processing the global position system signals received in an electronic warfare antenna, such as antenna 102 or 104 in FIG. 1, to accomplish the present antenna location function, is represented in FIG. 3 of the drawings herein. In the FIG. 3 drawing the 20 megahertz bandwidth L1 global position system signal is filtered through the band pass filter 300 and frequency up-converted to a 1980 to 2000 megahertz signal (i.e., a 1.98 to 2.0 gigahertz signal also of 20 megahertz bandwidth) in the mixer circuit 302—in order that it may be combined at 304 with the 2 to 3 gigahertz baseband signal from the filter bank 306. This combination involves only a 20 megahertz overall bandwidth increase in the receiver baseband, a small two percent increase with respect to a 1000 megahertz bandwidth that is normal for an electronic warfare receiver. Because of this adding signal to an existing path this second approach may be thought-of as tagging the global position system signal to one of the channels of an EW receiver. The digital baseband receiver at 320 in FIG. 3 includes an embodied Fourier transformation algorithm. The combined electronic warfare and global position system receiver is indicated at 312 in the FIG. 3 drawing.

In the FIG. 3 receiver arrangement the electronic warfare receiver function may be switched from band to band by the switch 308 in order to for example search for incoming radar signals of differing frequency (i.e., to perform the receiver's electronic warfare function) while the 20 megahertz global position system signal from the mixer 302 is always available for antenna location determination usage. Such combining of electronic warfare and global position system signal reception into a single apparatus is in fact the subject matter of the above identified and incorporated by reference herein patent document "GPS RECEIVER WITH ELECTRONIC WARFARE RECEIVER FONT END".

After the global position system signals from the antennas 102 and 104 in FIG. 1 are initially processed according to one of the approaches described herein or some other approach (including possible use of a monobit receiver arrangement described in the GPS RECEIVER WITH ELECTRONIC WARFARE RECEIVER FONT END" patent document) the sought after vector between two antennas can be determined. The accurate measurement of vectors between such antennas is preferably accomplished through use of global position system carrier phase measurement techniques wherein measurement accuracies into the range of millimeters are available. Such global position system carrier phase measurement techniques have been developed as a part of the differential GPS technical area and are believed well known in the art. Numerous publications describing both the differential global position system and the carrier phase measurement techniques subdivision of this system exist in the technical literature. One such publication of this nature is the 1996 two volume text set titled "Global Positioning System: Theory and Applications" Edited by Bradford W. Parkinson and James J. Spilker Jr. and published by the American Institute of Aeronautics and Astronautics Inc. of Washington D.C. Chapter 1 in the second volume of this text set discusses the differential global position system and section IV commencing at page 27 in this Chapter 1 discusses the carrier phase techniques of interest here. The contents of the "Global Positioning System: Theory and Applications" texts are hereby incorporated by reference herein.

In performing such carrier phase processing of signals from the antennas 102 and 104 in FIG. 1 the processing of signals from two electronic warfare receivers connected to these antennas can be treated as slave processing. The main or master receiver of the global position system receivers can provide ephemeris and navigation data, and initial code phase. This master receiver can also calculate the Doppler frequencies for each slave receiver in order to allow the slave receiver to keep the phase tracking loop tight. A tight tracking loop can assist the slave receivers in performing long coherent integrations and overcome a weak global position system signal condition. A coarse vector between the two electronic warfare antennas also can be calculated in order to ease vector measurements accomplished through carrier phase processing by reducing the number of ambiguity integer sets to be considered.

Figure 4:
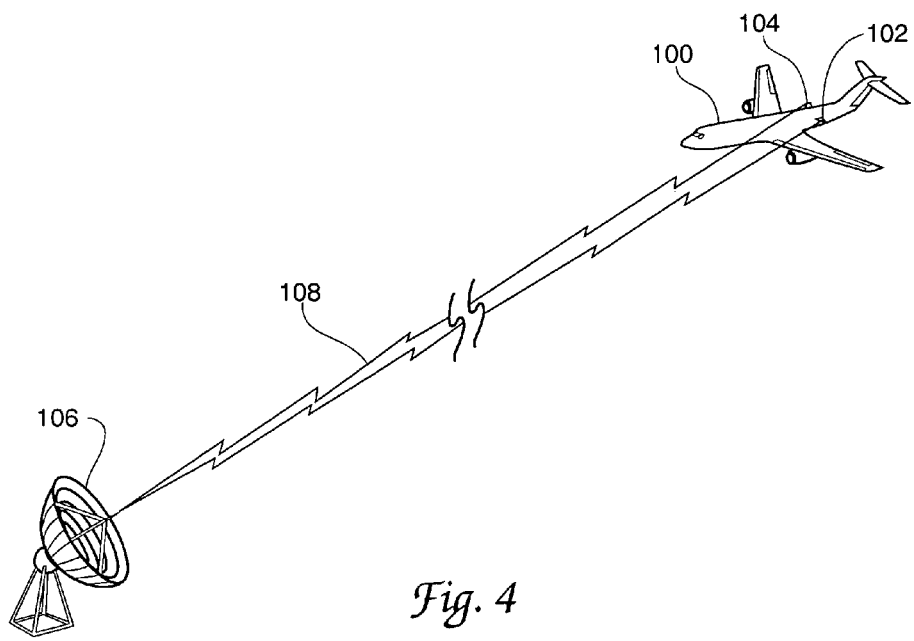
FIG. 4 shows a modified FIG. 1 aircraft locating a ground sourced electromagnetic signal through use of electronic warfare antennas mounted in an alternate aircraft location.

After reflecting on the present invention over a period of time a person of skill in the electronic warfare and global position system arts may come upon a concern that an electronic warfare antenna is not normally disposed in the posture of facing upward toward the location of a global position system satellite or of even having reasonable upward exposure—as has been depicted in the FIG. 1 drawing herein for drawing and discussion convenience. Although such an actual practice arrangement may indeed reduce the signal strength of signals received from satellites, such signals can nevertheless be received by way of side lobes existing in an electronic warfare antenna pattern. It has for example been demonstrated that even a left circular polarized global position system antenna mounted under the fuselage of an aircraft and facing the ground can successfully receive signals directly from satellites. (This notwithstanding the fact that such a left circular polarized global position system antenna is deliberately configured not to receive signal directly from a satellite.) In addition, an electronic warfare antenna as espoused herein is usually mounted on an aircraft facing somewhat laterally or sideways from the fuselage as is represented in the modification of the FIG. 1 drawing appearing in FIG. 4 herein. With this antenna mounting arrangement, global position system signals thusly received from satellites are sufficiently strong for determining an electronic warfare antenna location under most conditions encountered in a real world environment.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. The electronic warfare method of determining a location of a distant electromagnetic energy emitter with respect to an aircraft, an aircraft carrying a plurality of segregated electronic warfare antennas and receiving signals from said emitter via an extended emitter to aircraft path and said plurality of antennas, said method comprising the steps of:

determining an angle of arrival vector for signals received at said aircraft and said aircraft carried electronic warfare antennas from said distant electromagnetic energy emitter;

said step of determining an angle of arrival vector including pre calibrating selected angle of arrival accuracy-determining dimensional and location characteristics of said plurality of electronic warfare antennas using known standard signals of compatible frequency with that of said distant electromagnetic energy emitter signals;

said pre calibrating of selected angle of arrival accuracy-determining dimensional and locational characteristics of said plurality of electronic warfare antennas including calibration to a phase center location in each of said electronic warfare antennas; and deriving from said angle of arrival vector a range and angle vector connecting said distant electromagnetic energy emitter with a calibrated location of said electronic warfare antennas.

2. The electronic warfare method of determining a location of a distant electromagnetic energy emitter with respect to an aircraft of claim 1 wherein said known standard signals, in said step of pre calibrating selected angle of arrival accuracy-determining dimensional and location characteristics of said plurality of electronic warfare antennas using known standard signals, are global position system signals received via said electronic warfare system and said plurality of antennas.

3. The electronic warfare method of determining a location of a distant electromagnetic energy emitter with respect to an aircraft of claim 1 wherein said plurality of electronic warfare antennas are two in number.

4. Signal source locating apparatus comprising the combination of:
- a ground based source of microwave frequency electrical signals;
- an aircraft carried radio frequency receiving and signal processing apparatus compatible with said ground based source of microwave frequency electrical signals;
- said radio frequency receiving and signal processing apparatus including first and second signal receiving antenna members carried by said aircraft and generating angle of arrival related electrical signals in response to signals received from said ground based source of microwave frequency electrical signals;
- a source of standardized physical measurement calibration electrical signals of compatible frequency with said ground based source of microwave frequency electrical signals;
- means for calibrating selected portions of said electronic locating apparatus including location error generating dimensional portions of said first and second signal receiving antenna members carried by said aircraft in response to said standardized physical measurement calibration electrical signals; and
- signal location processing apparatus operative on said angle of arrival related electrical signals and generating electrical signals representing relative location of said ground based source of microwave frequency electrical signals with respect to said aircraft.

5. The signal source locating apparatus of claim 4 wherein said source of standardized physical measurement calibration electrical signals of compatible frequency with said ground based source of microwave frequency electrical signals is comprised of a global position system satellite.

6. The signal source locating apparatus of claim 4 wherein said means for calibrating selected portions of said electronic locating apparatus including location error generating dimensional portions of said first and second signal receiving antenna members carried by said aircraft in response to said standardized physical measurement calibration electrical signals includes an implemented differential global position system carrier phase responsive algorithm.

7. The signal source locating apparatus of claim 4 wherein means for calibrating selected portions of said electronic locating apparatus including location error generating dimensional portions of said first and second signal receiving antenna members carried by said aircraft in response to said standardized physical measurement calibration electrical signals includes antenna phase center dimensional portions of said first and second signal receiving antenna members.

8. The signal source locating apparatus of claim 4 wherein said signal location processing apparatus operative on said angle of arrival related electrical signals and generating electrical signals representing relative location of said ground based source of microwave frequency electrical signals with respect to said aircraft further includes signal location processing apparatus operative on said electrical signals representing relative location of said ground based source of microwave frequency electrical signals with respect to said aircraft and generating signals representing relative location of said ground based source of microwave frequency electrical signals with respect to a global position.

9. The signal source locating apparatus of claim 4 wherein said ground based source of microwave frequency electrical signals comprises a radar apparatus.

10. The signal source locating apparatus of claim 4 wherein said apparatus further includes a signal frequency converting mixer element.

11. Airborne electronic warfare signal source locating apparatus comprising the combination of:
- a ground based threat source of microwave frequency electrical signals;
- an aircraft carried combined electronic warfare and global position system radio frequency receiving and signal processing apparatus compatible with said ground based threat source of microwave frequency electrical signals;
- said combined electronic warfare and global position system radio frequency receiving and signal processing apparatus including first and second aircraft fuselage mounted signal receiving antenna members generating angle of arrival related electrical signals in response to signals received from said ground based threat source of microwave frequency electrical signals;
- a calibration source of global position system electrical signals of compatible frequency with said ground based threat source of microwave frequency electrical signals;
- means for characterizing selected portions of said electronic locating apparatus including location error generating dimensional portions of said first and second aircraft fuselage mounted signal receiving antenna members in response to said calibration global position system electrical signals; and
- signal location processing computer apparatus connected with said angle of arrival related electrical signals and generating electrical signals representing relative location of said ground based source of microwave frequency electrical signals with respect to said aircraft.

* * * * *